3,208,866
TiO₂ MANUFACTURE
Ernest D. Lewis, Swarthmore, Pa., and Juergen H. Braun, Wilmington, Del., assignors to E. I. du Pont de Nemours and Company, Wilmington, Del., a corporation of Delaware
No Drawing. Filed July 15, 1963, Ser. No. 295,176
12 Claims. (Cl. 106—300)

This application is a continuation-in-part of our co-pending application Serial No. 33,101, filed June 1, 1960, which application, now abandoned, is, in turn, a continuation-in-part of our parent application Serial No. 629,450, filed December 26, 1956, now abandoned.

This invention relates to the production of titanium dioxide pigments and to novel methods for obtaining improved types of such pigments. More particularly, it relates to novel, continuous methods for producing rutile titanium dioxide pigments and by the vapor phase oxidation of a titanium halide, such as titanium tetrachloride.

The preparation of pigmentary titanium dioxide by oxidizing titanium tetrachloride in the vapor state with an oxygen-containing gas is well known. Useful procedures therefor include those described in U.S. Patents 2,488,439, 2,488,440 and 2,559,638. It is also known that economic-wise, most favorable production arises when a relatively high concentration of oxygen is used in the oxidizing gas. This is due largely to the much smaller equipment sizes needed for the oxidation since the gas volumes are advantageously reduced by the amount of nitrogen gas eliminated from the system through substitution by pure oxygen for air. Further savings arise when the by-product chlorine from the oxidation is circulated to the titanium ore chlorination stage wherein TiCl₄ manufacture is being effected. However, as the concentration of oxygen in the oxidizing gas used as the reactant increases, and as the throughput in a given reactor increases, the cooled pigmentary product from the reactor decreases markedly in bulk density. This is very disadvantageous since it necessitates an undesired increase in equipment sizes required for solids handling throughout the remaining steps of the process. In consequence, increased costs are incurred and savings arising from an increase in the capacity of the reaction and from chlorine reuse in the system are lost.

As disclosed in the patents referred to, important control over the particle size and quality of the TiO₂ pigment can be effected. Thus, as contemplated in U.S. Patents 2,488,439 and 2,488,440, the addition of small, controlled amounts of water vapor or hydrogenous water formers to the TiCl₄ or oxidizing gas reactants promotes nucleation and production of a high quality, especially rutile pigment. However, at increased oxygen concentrations and a corresponding allowable increase in throughput in the same reactor system, the carbon black undertone (a measure of both particle size and particle size uniformity) decreases if the water of nucleation is held constant. When the water of nucleation is increased, some improvement in carbon black undertone is obtained at corresponding levels of throughput but not enough to provide a satisfactory pigment under all conditions. Disadvantageously, such increases in water of nucleation form another cost penalty on the process because more chlorine becomes lost by hydrogen chloride formation. Other controlling factors include the degree of preheat of the entering reactant gases to the reactor, the reaction temperatures, the spacial relationship of the reactor, rate of addition of reactant gases, the rapidity of commingling of the reactants, and the rapidity of cooling the reacted mixture.

It is among the objects of this invention to overcome the disadvantages and difficulties encountered in prior vapor phase methods for producing titanium dioxide pigments, especially through the continuous oxidation of titanium tetrachloride with an oxygen-containing gas and to provide novel and effective procedures for attaining such objects. It is among the particular objects of the invention to provide an improved method for obtaining high quality rutile titanium dioxide pigments by a vapor phase oxidation reaction wherein use of a high oxygen content oxygen-containing gas is utilized to extend the effectivenes and reduce the amounts of nucleating water vapor utilized, and to provide a continuous process for obtaining pigmentary rutile titanium dioxide pigment possessing improved uniformity of particle size, color, in-process bulk density, and other desired qualities.

These and other objects are realized in this invention which comprises producing pigmentary titanium dioxide by decomposing in the vapor phase a titanium halide, especially titanium tetrachloride, with an oxygen-containing gas at an elevated temperature and in the presence of a small, regulated amount of a metal ion nucleant, especially potassium.

In a more specific embodiment, the invention comprises preparing pigment quality rutile titanium dioxide continuously by reatcing within a closed, relatively restricted reaction zone, maintained at a temperature of at least 800° C. and preferably within a range of from about 900° C. to 1400° C., a preheated oxidizing gas containing from 10 to 100% oxygen by volume, and preheated, vaporized titanium tetrachloride, and effecting said reaction in the presence of small amounts of water vapor and potassium.

In one practical and preferred adaptation of the invention involving the preparation in accordance with the disclosure of U.S. Patent 2,559,638 of an aluminum oxide containing TiO₂ pigment, the reactants are charged to a suitable corrosin resistant type of reactor in which quick mixing and reaction can be readily effected. The reaction vessel should be of such design, construction and dimension that a continuous flow of reactants and reaction products can be readily maintained therein and such control can be exercised over the velocities, mixing rates, temperatures and reaction retention times utilized that, on the average, said reactants and products remain in the reaction zone for but a limited, relatively short period of time. Particularly useful types of reactor apparatus comprise those disclosed in Willcox U.S. Patent 2,791,490. Such apparatus can comprise an elongated mixing and reaction vessel, relatively restricted in cross section and constructed of a corrosion resistant metal or alloy and suitably lined with a refractory material such as fused silica, magnesia, porcelain, etc. Quick mixing and reaction is effected therein by separately and continuously charging the reactants at controlled rates into the reaction zone wherein quick mixing and reaction is brought about by charging one reactant as a thin, sheeted stream directly into the other reactant and in a direction angular to the axis of flow of such other reactant. For example, preheated, vaporized anhydrous titanium tetrachloride containing about 1% vaporous aluminum chloride, based on the TiO₂ being produced, can be continuously and separately charged to the reaction zone of the apparatus which zone is maintained within a 900–1400° C. temperature. Concurrently, preheated air enriched with water vapor in amounts ranging from about 50 to 100,000 parts per million (based on the TiO₂ being produced) and with from 0.01 to 400 parts, and particularly from about 1 to 5,000 parts per million (also based on the TiO₂ being produced) of potassium, incorporated in the air in the form of an aqueous solution of a potassium salt (chloride, nitrate, sulfate, etc.), is charged via a separate inlet to said zone. Quick commingling and reaction with formation of a TiO₂ product containing a small amount of Al₂O₃ results. The gaseous, TiO₂-containing suspension issuing from the reaction at a temperature of about 1150° C. is continuously and rapidly quenched to below 600° C. to prevent undesired increase in $TiO_2$ pigment particle size which, due to sintering, would otherwise occur to adversely affect pigment hiding power, strength and other essential properties. Rapid cooling can be conventionally effected, useful methods therefor including those described in U.S. Patent 2,721,626. The pigmentary $TiO_2$ product, at from about 75–250° C. temperature which is recovered from the quenching operation, is separated from the by-product gases and is subjected to a relatively mild calcination treatment in air at temperatures ranging from about 600° C. to 900° C. to remove residual reatcion by-products, including free or combined chlorine. The resulting pigment is then subjected to conventional dry milling or disintegration treatment as, for example, in a roller mill, hammer mill or micronizer fluid energy mill. Because of the high uniform bulk density of the in-process pigmentary product, such milling step is more readily and efficiently carried out because said irregularities are effectively eliminated and a more uniform, overall improved excellent quality white rutile titanium dioxide pigment results. The pigment possesses excellent color and soft texture characteristics and high tinting strength values as measured in ultramarine pigmented linseed oil rub-out tests, high hiding power in paint formulations, soft texture and a high degree of small particle size uniformity in the optimum size range as determined by its carbon black undertone values.

Due to tis uniformly small particle size, soft texture and inherently high tinting strength, color and opacity, the pigment is readily adapted for use in paints, enamels, finishes or other coating composition formulations as well as a delustrant for rayon, nylon or other artificial silks or fibers or as an essential pigmenting ingredient in printing inks, rubber, plastics and other uses. When aluminum is present to the extent of 0.5 to 2%, calculated as $Al_2O_3$ on the $TiO_2$ basis, the pigment will possess high yellowing and baking discoloration resistanec properties rendering it particularly adaptable for use in high temperature or baked refrigerator type enamels or like coatings. To a clearer understanding of the invention, the following examples are given.

EXAMPLE I

Employing a vapor phase reactor of the type disclosed in the aforesaid U.S. Patent 2,791,490, a series of runs made under varying conditions as tabulated below were carried out. The reactor comprised a refractory, tubular conduit into which a suitable oxygen-containing gas is separately introduced. The conduit was provided with a circumferential slot-jet in its wall through which titanium tetrachloride vapor was jetted into the oxygen gas stream in a thin, sheeted stream and in a direction perpendicular to the flow of the oxygen gas stream whereby substantially instantaneous reactant mixing and reaction took place. The reactants were introduced at approximately stoichiometrically equivalent rates and in each case the oxygen-containing gas (at 10% excess $O_2$) was preheated to about 1000° C. and the titanium tetrachloride vapor was preheated to about 800° C. to provide a reaction zone temperature, measured by thermocouple, ranging from about 900–1400° C., or from 1000–1600° C. (calculated adiabatic), depending upon oxygen concentration and the rate of throughput, etc. Varying concentrations and types of controlling salts, shown in Table I below, were incorporated in the stream in the form of a water solution, sprayed into the hot air stream just ahead of the reaction zone. The hot, reactive reaction product stream issuing from the reactor was quickly cooled by passing the suspension into an associated elongated, externally cooled tubular conduit of approximately the same diameter as the reactor and wherein cold, solid $TiO_2$ particles larger in size than the $TiO_2$ present in the reaction suspension were directly commingled therewith. The cooling rate was such that the initial quick cooling reduced the reaction product stream temperature at a rate of about 100° C. per second. The pigmentary $TiO_2$ product was then separated from the cool suspension by treatment in conventional solids-gas separating equipment, following which the separated product was fed to a continuous rotary calciner maintained at 700–800° C. to remove adsorbed and occluded chlorides. The resulting calcined pigmentary $TiO_2$ product was then subjected to fluid energy milling treatment to obtain the desired finished white $TiO_2$ pigment product.

Table I

| Run No. | Percent $O_2$ by vol., bal. $N_2$ | $TiO_2$ production, units/hr. | K cpd. added | Additive conc., p.p.m.[1] | Nucl. water[2] | In-proc. bulk density | CBU[3] |
|---|---|---|---|---|---|---|---|
| 1 | 33 | 125 | | | 2 | 20 | 8 |
| 2 | 33 | 125 | $KNO_3$ | 6 K | 2 | 29 | 10 |
| 3 | 33 | 125 | $KNO_3$ | 20 K | 2 | 35 | 13 |
| 4 | 37 | 140 | | 0 | 3 | 15 | 7½ |
| 5 | 37 | 140 | KCl | 30 K | 3 | 35 | 13 |
| 6 | 37 | 150 | KCl | 47 K | 3 | 38 | 14 |
| 7 | 41 | 135 | | 0 | 3.5 | 20 | 7½ |
| 8 | 41 | 135 | $KNO_3$ | 12 K | 3.5 | 33 | 10½ |
| 9 | 41 | 135 | $KNO_3$ | 23 K | 3.5 | 36 | 11½ |
| 10 | 41 | 135 | | 0 | 7 | 18 | 9 |
| 11 | 41 | 150 | KCl | 15 K | 3 | 35 | 10 |
| 12 | 52 | 190 | | 0 | 4 | 14 | 6½ |
| 13 | 52 | 180 | KCl | 15 K | 4 | 23 | 8 |
| 14 | 52 | 180 | KCl | 10 K | 3 | 28 | 8 |
| 15 | 52 | 180 | KCl | 15 K | 1.5 | 32 | 8 |
| 16 | 52 | 180 | KCl | 10 K | .2 | 32 | 8 |
| 17 | 100 | 230 | | 0 | 3 | 14 | 2 |
| 18 | 100 | 205 | KCl | 10 K | 4 | 28 | 7 |
| 19 | 41 | 135 | | 0 | 3.5 | 20 | 7½ |
| 20 | 41 | 135 | $KNO_3$ | 12 K | 3.5 | 33 | 10½ |
| 21 | 41 | 150 | KCl | 10 K | 2.5 | 32 | 10 |
| 22 | 41 | 145 | $K_2SO_4$ | 11 K | 3 | 30 | 9 |
| 23 | 41 | 180 | $K_2HPO_4$ | 12 K | 2.5 | 29 | 10 |
| 24 | 41 | 170 | KOH | 10 K | 2.5 | 23 | 8 |
| 24A | 52 | 200 | $KC_2H_3O_2$ | 11 K | 4 | 27 | 9 |
| 25 | 52 | 160 | KCl | 3 K | 3.5 | 25 | 8 |
| 26 | 52 | 160 | KCl | 25 K | 3.5 | 26 | 8½ |
| 27 | 52 | 160 | KCl | 75 K | 5 | 26 | 10 |
| 28 | 52 | 160 | KCl | 250 K | 7 | 34 | 12½ |
| 29 | 52 | 160 | KCl | 750 K | 7.5 | 38 | 12 |
| 30 | 41 | 170 | KCl | .05 K | 2.5 | 23 | 7½ |
| 31 | 41 | 140 | KCl | .1 K | 1.5 | 23 | 8 |
| 32 | 41 | 135 | KCl | .1 K | 3.0 | 22 | 7½ |
| 33 | 41 | 135 | KCl | .02 K | 4.5 | 23 | 8 |
| 34 | 41 | 135 | KCl | .03 K | 4.5 | 23 | 9 |
| 35 | 63 | 160 | KCl | 6 K | 3.0 | 27 | 8 |
| 36 | 63 | 160 | KCl | 6 K | 3.0 | 25 | 8 |

[1] Based on $TiO_2$ being produced.
[2] Values given multiplied by 10,000 are equal to p.p.m. based on $TiO_2$ being produced.
[3] Carbon black undertone.

EXAMPLE II

In another series of runs, various metal ion nucleants, listed in Table II below, were employed in the production of a $TiO_2$ pigment in a continuously operating vapor phase reactor constructed as described in Example I to obtain the bulk density and CBU values shown. In such operation, a stream of titanium tetrachloride vapor, heated to 740° C., was caused to be reacted therein at 900–1400° C. with a stream of air and oxygen (equivalent to 43% $O_2$ by volume) which had been heated to a temperature of about 1070° C. The metal ion nucleant was introduced as a water solution into the oxygen gas stream being charged to the reactor. The oxygen used was in slight excess (20–30%) over stoichiometric equivalents and the $TiO_2$ was produced at a rate of 115 production units per hour. The total water vapor (nucleating steam) added to the air stream includes the water in which the metal ion nucleant salt was dissolved, and was maintained within the range of .9 and 1.1 pounds $H_2O$/100 pounds $TiO_2$ produced.

The amounts of metal salts shown and used are based on the metal ion, and varied from 10 to 1000 parts per million. Samples were taken from the cooled discharge line of the reactor which represented the products obtained at various nucleating levels, and were calcined at 600° C. to remove residual chlorine. Prior to undertaking these runs, Run No. 40 below was made in which no added metal ion nucleant was present to obtain a base level or carbon black undertone and bulk density pigment properties. The water solution containing the metal ion nucleant was added to the air stream through a water-cooled refractory metal tubing just before its introduction into the reactor so that the solution would be charged into the air stream at a point near its center.

Table II

| Run No. | Compd. added | P.p.m. (metal ion) | In process bulk density | CBU |
|---|---|---|---|---|
| 40 | None | None | 24 | 7½ |
| 41 | LiCl | 50 | 31 | 12 |
| 42 | LiCl | 200 | 26 | 12 |
| 43 | LiCl | 1,000 | 25 | 11½ |
| 44 | NaCl | 10 | 28 | 9½ |
| 45 | NaCl | 50 | 30 | 11 |
| 46 | NaCl | 200 | 30 | 12 |
| 47 | NaCl | 1,000 | 30 | 11½ |
| 48 | KCl | 10 | 30 | 9½ |
| 49 | KCl | 50 | 32 | 13 |
| 50 | KCl | 200 | 33 | 14 |
| 51 | KCl | 1,000 | 37 | 16 |
| 52 | RbCl | 10 | 34 | 12 |
| 53 | RbCl | 50 | 36 | 15 |
| 54 | RbCl | 200 | 35 | 17 |
| 55 | RbCl | 1,000 | 41 | 17½ |
| 56 | $Cs_2CO_3$ | 10 | 26 | 11½ |
| 57 | $Cs_2CO_3$ | 50 | 27 | 14½ |
| 58 | $Cs_2CO_3$ | 200 | 30 | 14 |
| 59 | $Cs_2CO_3$ | 1,000 | 37 | 14½ |
| 60 | $CaCl_2$ | 10 | 32 | 11 |
| 61 | $CaCl_2$ | 50 | 31 | 14½ |
| 62 | $CaCl_2$ | 200 | 30 | 17½ |
| 63 | $CaCl_2$ | 1,000 | 31 | 19 |
| 64 | $SrCl_2$ | 50 | 32 | 12 |
| 65 | $SrCl_2$ | 200 | 33 | 12 |
| 66 | $SrCl_2$ | 1,000 | 29 | 15 |
| 67 | $BaCl_2$ | 200 | 30 | 10½ |
| 68 | $BaCl_2$ | 1,000 | 30 | 12 |
| 69 | $CeCl_3$ | 10 | 29 | 9½ |
| 70 | $CeCl_3$ | 50 | 29 | 10 |
| 71 | $CeCl_3$ | 200 | 28 | 10½ |
| 72 | $CeCl_3$ | 1,000 | 29 | 11 |

EXAMPLE III

In this example, a reactor was employed which was generally designed according to that shown in U.S. Patent 2,791,490, having a 17 inch diameter cylindrical reaction zone modified however, to provide, as described in U.S. Patent 2,915,367, a porous reaction zone wall section just downstream from the mixing slot so that chlorine could be fed through the pores to prevent deposit on the reaction zone walls and provide cooling. A heat exchanger device suitably was associated with the reactor which continuously provided heated pebbles capable of heating the required amount of oxygen to 1300° C. being fed to the reactor. Means for preheating the $TiCl_4$ reactant and for introducing a solution of potassium chloride into the oxidizing gas were provided together with a device for adding aluminum chloride to the $TiCl_4$ in accordance with the method described in U.S. Patent 2,790,704.

On start up, 3333#/hr. of commercially pure oxygen and 6140#/hr. of dry air were metered into the pebble heater where it was heated to 1300° C. and then passed through the reactor to heat it to operating temperature. Chlorine was then flowed in through the porous wall section of the reactor at about 5000#/hr. Chemically purified, fractionally distilled titanium tetrachloride reactant was separately vaporized and heated to 450° C. and treated with $AlCl_3$ to give 1% of $Al_2O_3$ on the $TiO_2$ produced, and this reactant was fed, through the slot inlet to the reactor, at 11.75 tons $TiCl_4$/hr. 40#/hr. of steam was jetted into the hot oxygen-air stream and a water solution, containing 3.83 gms. KCl/liter, was sprayed into the hot oxygen gas stream at 1.8 gal./hr. Reaction of the $TiCl_4$ and hot oxygen in the reaction zone at 1000° C. was spontaneous. The product stream containing $TiO_2$ pigment was cooled and the pigment recovered at the rate of 4.95 tons/hr. or a 99% yield based on the $TiCl_4$. The residual chlorides were removed from the pigment by calcination in air. The resulting pigmentary product was good quality pigmentary rutile $TiO_2$ having a bulk density of 30#/cu. ft. and a CBU value of 10 in contrast to a product bulk density value of 18#/cu. ft. and a CBU value of 5 when the process was undertaken but without KCl nucleant use.

When the conditions of this Example were varied by employing a KCl solution of 19 gms./liter concentration, the $TiO_2$ product obtained exhibited a bulk density value 35#/cu. ft. and a CBU value of 14.

The carbon black undertone (CBU) values set forth above were determined by the methods described in U.S. Patent No. 2,488,440 using a rating or value of 10 rather than 100 as used in said patent. A CBU value of 6 represents an acceptable quality pigment, with a preferred product exhibiting a CBU value in the range of 8–16 or higher. The term "bulk density" refers to the pounds per cubic foot of an uncompacted pigmentary material, while the term "in-process" refers to such material prior to subjecting it to a final grinding or comminution treatment. Preferably, the in-process bulk density values of the products of this invention range from 20–40 pounds per cubic foot. A pigmentary material having a low bulk density, below, say, 15, will result in very difficult solids handling throughout the pigment finishing steps, especially when a fluid energy mill treatment is undertaken. When higher values (above the indicated preferred range) are obtained, the pigmentary product exhibits reduced flowing characteristics and therefore may cause disadvantageous obstruction or stoppage of equipment. With a pigmentary material having the high bulk density value attainable in this invention and as a result of a very high rate of addition of the nucleating metal ion to the oxygen stream, recourse to wet finishing can be readily undertaken and in place of a calcination treatment to remove adsorbed chlorine and retained potassium or other metal ion salts and to produce a pigment possessing satisfactory gloss characteristics.

Pigment values, such as color, tinting strength, hiding power, particle size, etc., can be readily determined in accordance with the methods described in U.S. Patent No. 2,253,551.

While described in the examples in its application to particular embodiments, the invention is not limited thereto. Thus, although recourse has been had to specific compounds of potassium and other metals for yielding a desired ion nucleant, employment is generally contemplated of the alkali metals sodium, potassium, lithium, rubidium and cesium, the alkaline earth metals calcium, strontium and barium, and the metal cerium or various mixtures or combinations thereof. Of such metals, those of potassium, calcium, rubidium and cerium are preferred for use to obtain optimum beneficial effects under the invention. Such metals can be added in their elemental state as vapor, liquid or solid or as their various soluble or insoluble inorganic or organic compounds. For example, in addition to the water soluble metal compounds mentioned in said examples, the various nitrates, halides (chlorides, bromides, iodides, fluorides), sulfates, phosphates, carbonates, silicates, acetates, alcoholates, benzoates, hydroxides and oxides of the metals above mentioned, or desired and useful mixtures of such compounds can be employed.

The amount of potassium or other metal-ion-nucleant forming compound contemplated for employment in the process can vary. Thus, in a process wherein the cooled pigment from the reactor is calcined in air to remove residual chlorine or recourse is being had to wet processing to remove occluded chlorine and residual potassium or other added metal remaining in the pigment, amounts ranging from 0.01 to 10,000 parts per million, based on the $TiO_2$ product being produced, can be used. A preferred amount ranges from about 1 part to 5,000 parts by weight on the $TiO_2$ basis. The wet or aqueous processing mentioned above includes grinding of the pigmentary $TiO_2$ in aqueous media, decanting or filtering to recover the pigment substantially free of water-soluble salts, especially chlorine or chloride compounds.

As noted above, the potassium or other metal ion nucleant used is preferably added to or incorporated in the reactant oxygen gas stream being charged to the reactor, either as a finely divided solid, as a water solution, as a non-aqueous solution, as a molten salt, or as a colloidal dispersion. If desired, it may be charged directly into the reaction zone or to the mixed or mixing reactants just ahead of the actual flame of the reaction. Sometimes the deposition of solids on the inlet areas of the reactor is prevented by introducing a third inert gas between the inflowing reactor streams. This spacing gas stream may be used to carry in the metal ions or their compounds used in this invention. Solutions of various salts of these metals may be sprayed into the gas stream and conveyed into the reaction as a mist. Also, especially in the case of the alkali halides, they may be conveyed in as fine solids or smoke. When the spacing gas is inert like argon it may carry the alkalinous metals in elemental vapor form by suitable injection means or by recourse to any other desired means. Prior to such commingling, preferably a small, controlled amount of water vapor, ranging from about 50–100,000 parts per million, based on the $TiO_2$ being produced, is added to such oxidizing gas stream. Any water utilized as a solvent for the potassium or other metal ion is considered in the total moisture added as water for the nucleation. Any hydrogen-containing organic compound used as a liquid medium, as, for example, benzene, burns to form water and also acts as the water of nucleation.

The potassium or other metal ion or compound added can be used in addition to or in place of water nucleation. Since in the instance of potassium that cation is the effective agent, compounds having various anions may be used as desired. Preferably, an inorganic or organic anion which does not have an undesirable colorizing effect upon the titanium dioxide is employed, since normally the product desired is of the whitest and most stable color obtainable. For example, when $K_2CrO_4$ is used as a potassium ion source, a titanium dioxide pigment with a yellowish cast may be obtained. Hence, though such types of compounds are utilizable, they are not employed where such undesired coloration is to be avoided.

While the presence of water vapor is not essential to producing good pigment when the agents of this invention are used, the use of water solutions of the soluble salts, preferably a chloride, affords an excellent means of controlling product property and compensating for variations in other process conditions which do occur in spite of careful watching. For example, the amount of a given salt solution used can be varied to hold the CBU value constant. To provide more accurate control without varying the amount of water vapor used, two salt solutions of different concentration can be provided and blended as desired at constant water consumption. These solutions are usually carefully made up with pure agents. However, the presence of other substances which are not deleterious can be tolerated. Mixtures of salts are also effective. Naturally occurring solutions and brines which contain the alkali and earth metal salts and are free of discoloring ions may be used if clear or clarified of silt and other debris.

While specific oxidizing gases have been mentioned, use is generally contemplated of oxygen, air, oxygen-enriched air, or mixtures of oxygen or air with various inert gases, such as nitrogen, $CO_2$ and the like. Such gases preferably contain controlled amounts of water vapor ranging from .1 to 3% or from, say, .05 to 10%, based on the total volume of gaseous reactants being fed to the reaction zone and in accordance with the disclosure of U.S. Patent No. 2,488,439. In utilizing the oxidizing media, the process is preferably operated with amounts of oxidizing gas sufficient to provide a product gas containing about 30% $Cl_2$ by volume, when air is used as the oxygen source, and 90–95% when gaseous oxygen is employed.

Normally, the oxidation reaction is carried out at substantially atmospheric pressures but, if desired, super- or subatmospheric pressures can be resorted to. The time period of retention of reactants and reaction products within the reaction zone is also important to the production of the pigment quality products. In general, the retention time of all reactants within the mixing and reaction zone must not exceed about 5 seconds nor be less than about .01 second with a preferred time, to obtain an optimum quality $TiO_2$ pigment, being in the range of from .05 to 1 second.

The titanium tetrachloride used preferably comprises a high-purity, anhydrous material free of undesired contaminants such as vanadium, iron, copper, etc., in order to assure production of a pigment exhibiting exceptionally high whiteness and brightness characteristics.

The nucleating action of potassium or the other metals mentioned in very small amounts in the oxygen gas stream differs from that of water and in some respects complements water present in that reactant. Not only does one thereby obtain the advantageous effect of water alone upon pigment properties, including tinting strength, hiding power, color, gloss, but there is imparted a controlling effect upon the ultimate pigment particle size as demonstrated by the carbon black undertone and in-process bulk density values given. For example, it has been found that for a given set of conditions with increase of water addition, the in-process bulk density decreases while it increases with increasing potassium or other metal ion addition.

While the process has been described in reference to the mixing and reacting of streams of oxygen and vaporized titanium tetrachloride in a conduit-type reactor with utilization of a circumferential slot jet for introducing one reactant into the other, this is merely preferred to obtain substantially instantaneous mixing and reaction. Use is contemplated of other forms and means of continuous mixing to effect the desired reaction. For example, the reactants, after separately adding or otherwise incorporating the desired metal ion reagent therein in accordance with a preferred embodiment, can be mixed at the angular intersection of two or more tubular lines feeding the reactants into a tubular reaction chamber, and, if desired, such mixing of reactants can be carried out with the aid of suitable baffles and as the reactants emerge in co-current streams into such reaction chamber.

The action of the metal ion nucleants and their various compounds used in this invention has often been described as one of nucleation. This is not necessarily the manner in which they affect the pigment particles. Nucleation is a classical concept of particle size control and probably plays a part here especially when these metals are in an ionic state. It is also possible that these substances act as growth inhibitors. While it is believed that although these ions may be present, the salts may dissociate at the reaction temperature and carry out their function in the form of free atoms as free radical catalysts. In either case their manner of operation does not deter their usefulness in the process herein claimed.

The advantages of the invention are numerous. Because higher oxygen substitution is obtainable with comparable product properties, increased throughput rates through existing equipment results, limited by the volume of inerts that have to be heated, cooled and conveyed. Furthermore, much greater economy in apparatus construction is achieved and much more versatility in regard to throughput rate in a given reactor is possible. An increase in CBU values to levels not otherwise attainable without severe cost penalty is readily obtained. Because nucleation water can be considerably reduced due to the use of our novel potassium or other metal nucleators, much less hydrochloride acid is formed and an advantageous chlorine savings arises due to avoidance of a very appreciable chlorine loss. This is particularly true when operating at relatively high oxygen rates. A further advantage resides in the control of in-process bulk density effected. This affords production of a more uniform product in respect to CBU, bulk density, and, indirectly, gloss, which is not obtainable upon recourse to water nucleation alone. Thus, one thereby attains simplification of operating control problems in cooling the reaction product, separation from the reaction by-product gases, feeding the milling equipment, and lowering production costs. Also, separate addition of the additive and nucleation steam permits one to control CBU and bulk density independently as required by quality specifications and operating conditions. Finally, conveying difficulties and apparatus pluggage caused by low bulk density pigment is prevented.

We claim:

1. A process for producing pigmentary titanium dioxide exhibiting improved in-process bulk density and carbon black undertone properties which comprises reacting titanium tetrachloride and an oxygen-containing gas in the vapor phase at a reaction zone temperature of at least 800° C. in the presence of from about 50 to 100,000 parts per million, based on the $TiO_2$ under production, of water vapor and from about 0.01 to 10,000 parts per million, based on the $TiO_2$, of a metal ion nucleant selected from the group consisting of sodium, potassium, lithium, rubidium, cesium, calcium, barium, strontium and cerium, and thereafter recovering the resulting titanium dioxide pigment.

2. A process for producing pigmentary rutile titanium dioxide exhibiting improved in-process bulk density and carbon black undertone properties comprising reacting titanium tetrachloride and an oxygen-containing gas within a closed reaction zone at temperatures ranging from about 800–1400° C. in the presence of from about 50 to 100,000 parts per million, based on the $TiO_2$ being produced, of water vapor and from about 1 to 5000 parts per million based on said $TiO_2$ of a metal ion nucleant selected from the group consisting of sodium, potassium, lithium, rubidium, cesium, calcium, barium, strontium and cerium, and thereafter recovering the resulting titanium dioxide pigment.

3. A process for producing titanium dioxide pigment exhibiting improved in-process bulk density and carbon black undertone properties which comprises vapor phase reacting in the presence of from about .1% to 3%, based on the $TiO_2$, of water vapor, titanium tetrachloride and an oxygen-containing gas as reactants, effecting said reaction at a temperature of from 800–1400° C., prior to said reaction incorporating in a reactant from 0.01 to 10,000 parts per million, based on the $TiO_2$, of a metal ion nucleant forming compound of a metal selected from the group consisting of sodium, potassium, lithium, rubidium, cesium, calcium, barium, strontium and cerium, and thereafter recovering the resulting titanium dioxide pigment.

4. A process for producing rutile titanium dioxide pigment exhibiting improved in-process bulk density and carbon black undertone properties comprising vapor phase reacting in the presence of from about .1% to 3%, based on the $TiO_2$ of water vapor, titanium tetrachloride and an oxygen-containing gas, effecting said reaction at temperatures ranging from 900–1400° C., prior to said reaction incorporating in said oxygen gas reactant from about 1 to 5000 parts per million, based on the $TiO_2$ pigment being produced, of a potassium ion nucleant, and thereafter recovering the titanium dioxide pigment product.

5. A process for producing rutile titanium dioxide pigment exhibiting improved in-process bulk density and carbon black undertone properties comprising vapor phase reacting in the presence of from about .1% to 3%, based on the $TiO_2$ of water vapor, titanium tetrachloride and an oxygen-containing gas at temperatures ranging from 900–1400° C. prior to said reaction incorporating in said oxygen gas reactant from about 1 to 5000 parts per million, based on the $TiO_2$ pigment under production, of a calcium ion nucleant, and thereafter recovering the titanium dioxide pigment product.

6. A process for producing rutile titanium dioxide pigment exhibiting improved in-process bulk density and carbon black undertone properties comprising vapor phase reacting in the presence of from about .1% to 3%, based on the $TiO_2$ of water vapor, titanium tetrachloride and an oxygen-containing gas at temperatures ranging from 900–1400° C. prior to said reaction incorporating in said oxygen gas reactant from about 1 to 5000 parts per million, based on the pigment, of cerium ion nucleant, and thereafter recovering the titanium dioxide pigment product.

7. A process for producing rutile titanium dioxide pigment exhibiting improved in-process bulk density and carbon black undertone properties comprising vapor phase reacting in the presence of from about .1% to 3%, based on the $TiO_2$ of water vapor, and from about 1 to 5000 parts per million, based on the $TiO_2$ of potassium as potassium chloride, titanium tetrachloride and an oxygen-containing gas at temperatures ranging from 900–1400° C., and thereafter recovering the titanium dioxide pigment product.

8. A process for producing rutile titanium dioxide exhibiting improved in-process bulk density and carbon black undertone properties which comprises decomposing within a closed reaction zone maintained at from 800–1400° C., heated, vaporized titanium tetrachloride containing about 1%, based on the $TiO_2$ under production, of aluminum chloride, with a heated oxidizing gas containing 10 to 100% by volume of oxygen, based on the total volume of oxidizing gas, from 50–100,000 parts per million of water vapor, effecting said decomposition in the presence of from 1–5000 parts per million, based on the titanium dioxide, of a metal ion nucleant selected from the group consisting of sodium, potassium, lithium, rubidium, cesium, calcium, barium, strontium and cerium, rapidly withdrawing the reaction products formed in said zone and subjecting them to rapid cooling, separating the cooled $TiO_2$ reaction product from by-product gases, removing occluded chlorine from the cooled, separated $TiO_2$ product, and recovering the rutile titanium dioxide pigment product.

9. A process for producing rutile titanium dioxide exhibiting improved in-process bulk density and carbon black undertone properties which comprises decomposing within a closed reaction zone maintained at from 800–

1400° C., heated, vaporized titanium tetrachloride containing about 1%, based on the TiO$_2$ under production, of aluminum chloride, with a heated oxidizing gas containing 10 to 100% by volume of oxygen, based on the total volume of oxidizing gas, from 50–100,000 parts per million of water vapor and 1–5000 parts per million, based on the titanium dioxide, of a metal ion nucleant selected from the group consisting of sodium, potassium, lithium, rubidium, cesium, calcium, barium, strontium and cerium, rapidly withdrawing from said zone reaction products which form therein and subjecting them to rapid cooling, separating the cooled TiO$_2$ product from reaction by-product gases, calcining the separated TiO$_2$ product in air at from about 600–900° C., and then cooling and recovering the rutile titanium oxide pigment product.

10. A process for producing rutile titanium dioxide comprising separately and continuously charging into a reaction zone maintained at temperatures ranging from about 800–1400° C. for rapid mixing and reaction therein, a stream of heated, vaporized titanium tetrachloride containing about 1%, based on the TiO$_2$ under production, of aluminum chloride, and a heated stream of an oxidizing gas containing about 10 to 100% by volume of oxygen, based on the total volume of said oxidizing gas, from 50 to 100,000 parts per million of water vapor, and from about 1 to 10,000 parts per million, based on the TiO$_2$ of a metal ion nucleant selected from the group consisting of sodium, potassium, lithium, rubidium, cesium, calcium, barium, strontium and cesium, rapidly cooling the resulting TiO$_2$-containing reaction product on its discharge from said zone, separating the cooled TiO$_2$ product from gaseous reaction by-products, removing occluded reaction product chlorine from the cooled, separated TiO$_2$ by subjecting said TiO$_2$ to aqueous media treatment, and recovering the resulting pigmentary titanium dioxide product.

11. A process for producing pigmentary TiO$_2$ having improved properties in respect to in-process bulk density and carbon black undertone, which comprises reacting in the vapor phase within a closed reaction zone at temperatures ranging from 900–1400° C. and in the presence of from .1–3%, based on the TiO$_2$, of water vapor nucleant, TiCl$_4$ with an oxygen-containing gas to which gas has been added from 1 to 5,000 parts per million, also based on the TiO$_2$, of a potassium nucleant, and recovering the resulting TiO$_2$ product.

12. A process for producing pigmentary TiO$_2$ having improved properties in respect to in-process bulk density and carbon black undertone, which comprises reacting in the vapor phase within a closed reaction zone at temperatures ranging from 900–1400° C. and in the presence of from .1–3%, based on said TiO$_2$, of water vapor nucleant, TiCl$_4$ containing about 1%, based on the TiO$_2$, of aluminum chloride, with an oxygen-containing gas to which gas has been added from 1 to 5,000 parts per million, also based on said TiO$_2$, of a potassium nucleant, and thereafter wet finishing and recovering the resulting TiO$_2$ product.

References Cited by the Examiner
UNITED STATES PATENTS

| | | | |
|---|---|---|---|
| 2,488,439 | 11/49 | Schaumann | 23—202 |
| 2,691,571 | 10/54 | Schaumann et al. | 23—202 |
| 2,798,819 | 7/57 | Schaumann | 23—202 |

MAURICE A. BRINDISI, *Primary Examiner.*